United States Patent Office 3,437,614
Patented Apr. 8, 1969

3,437,614
RACETRACK BASE PAVING COMPOSITION
Dale A. Young, Basking Ridge, and Luke W. Corbett, Mountainside, N.J., assignors to Esso Research and Engineering Company, a corporation of Delaware
No Drawing. Filed Dec. 23, 1965, Ser. No. 516,076
Int. Cl. C08f *37/18;* C08h *13/08*
U.S. Cl. 260—17.4                    7 Claims

ABSTRACT OF THE DISCLOSURE

Paving compositions consisting of sand aggregate, asbestos, cork and a binder composition made up of petroleum resin, and amorphous polypropylene and a mineral oil plasticizer have unique resiliency properties. The paving compositions have been found particularly suitable for base constructions in racetracks for horses.

The present invention relates to novel thremoplastic paving compositions. More particularly, the present invention is directed to paving compositions that have a high degree of resiliency which renders the compositions useful for the base construction of horserace tracks.

The maintenance of racetracks and their bases is a problem of increasing concern to those charged with this responsibility. In many areas the racing season is conducted on nearly a year-round basis and tracks must be maintained in running condition even during periods of inclement weather. Many racetracks are constructed with a base consisting of well-densified loam particularly sandy-loam over which is placed a 1-inch loose sandy cushion course. When thoroughly dry, as in the warm summer periods, these bases become very hard. During the wetter and colder seasons they tend to absorb moisture, become softer, and the running characteristics of the track are seriously altered. The varying nature of such bases is of concern to horse owners and the track operators because of the effect on the performance of the horses. The very dry and hard bases are also less desirable because of the damaging effect on horses' hooves and legs. A track surface whose running charactersitics do not vary with weather changes, that is impervious to moisture, and yet resilient to the forces applied as the horses' hooves strike the track has been a continued object of search.

Now, in accordance with the present invention, it has been discovered that resilient, "all-weather" racetracks can be constructed by paving a prepared substrata with a thin layer of a composition formed by admixing major amounts of aggregate and minor amounts of asbestos and cork with a binder composition made up of a major amount of a petroleum resin and minor amounts of amorphous polyalphaolefins and a petroleum mineral oil.

The paving compositions of the present invention comprise from about 77 to 96.5 wt. percent, preferably 84 to 94 wt. percent of a mineral aggregate plus filler; from 0.2 to 5.0, preferably 0.5 to 3.0 wt. percent asbestos; 0.3 to 5.0, preferably 0.5 to 2.0 wt. percent cork; and from 3 to 13, preferably 5 to 11 wt. percent of the petroleum resin based binder. The total paving composition is preferably prepared in conventional pug mill equipment that has been customarily used in the manufacture of paving mixes at temperatures not exceeding 450° F. The finished paving compositions can be applied to prepared substrata at conventional temperatures using widely known paving equipment.

Typically, the aggregate used in the paving composition has a particle size distribution varying from about one inch to less than 50 microns. The particle size distribution of the filler which can be used in conjunction with the aggregate varies in sizes from about 200 to 10 microns. The asbestos used in the composition is preferably a finely divided asbestos such as Johns-Manville's 7RO5. Finely divided cork is preferably used in the paving compositions. Cork passing through a #10 mesh sieve but retained on a #40 mesh sieve (10–40 mesh) as well as cork passing through a #10 mesh sieve but retained on a #20 mesh sieve (10–20 mesh) can be used.

The preferred binder composition, according to the present invention, comprises a petroleum resin formed from olefins contained in steam cracked petroleum naphtha, a residual petroleum oil free of asphalt, and a substantially non-crystalline or highly amorphous polymer of propylene; these three components being intimately mixed together or homogeneously blended. Although amorphous polypropylene is the preferred constituent in the present binder composition, amorphous copolymers of propylene such as ethylene-propylene copolymers may also be used. The viscosity average molecular weight of useful propylene polymers may vary over a wide range but, in general, will vary from about 10,000 to 200,000 and more generally from about 10,000 to 100,000. In the case of atactic polypropylene, viscosity average molecular weights generally range from about 25,000 to 60,000.

Although it is desirable, insofar as it is practical to do so, to employ entirely amorphous polymeric materials, it is not always possible to secure such purities particularly in commercial operations. However, polymers containing a major proportion of amorphous polymer can be used. As much as 20 wt. percent isotactic or crystalline material may be tolerated in the amorphous polymer; but preferably amorphous polypropylene containing from 85 to 90 wt. percent atactic polymer is employed. The proportion of amorphous polymer of propylene, for example, atactic polypropylene, present in the binder composition varies between 2 to 40% by weight preferably between 5 to 20% by weight.

The petroleum resins particularly useful in combination with the above-described amorphous polyolefins are those which are described in detail in U.S. Patent No. 3,070,570, the disclosure of which is incorporated herein by reference. The desired petroleum resins are produced by an aluminum chloride catalyzed polymerization of $C_5$ to $C_8$ olefins and diolefins present in steam cracked naphtha. According to the present invention, the petroleum resin component comprises from about 30 to 65% by weight, preferably 45 to 60% by weight of the total binder composition. Commercially available petroleum resins have softening points ranging from 125% F. to as high as 250° F., for example, 158° F., 185° F. and 212° F., measured by the Ring and Ball method (ASTM D36–26). The resins normally exhibit intrinsic viscosities in the range of from about 0.037 to 0.126, average molecular weights between about 1000 and 1500, and Wijs iodine numbers between about 92 and 119. However, lower iodine numbers are secured when the resins are hydrogenated for color improvement.

The petroleum mineral oil utilized as the third component of the binder composition is obtained from petroleum crude oil such as "Coastal" or "naphthenic" or "mixed base" crude oils. The petroleum or plasticizer oil should be essentially asphalt-free and have a viscosity of at least 40 Seconds Saybolt Universal (SSU) at 210° F., preferably above 200 SSU at 210° F. Useful oils exhibit a number average molecular weight of at least 300 and more generally in the range between about 350 to 1000 and have initial boiling points above 500° F. at atmospheric pressure. Typical oils that have been found suitable as a component of the instant binder compositions include: (1) naphthenic oils having a molecular weight of about 440, a viscosity of about 582 SSU at 100° F., and a mid-boiling point corresponding to about 875° F.±50° F. at atmospheric pressure; (2) naphthenic oils having a viscosity of from 210 to 220 SSU at 210° F., a molecular weight of about 685, and a mid-boiling point corresponding to about 1050° F.±100° F. at atmospheric pressure; and (3) deasphalted, undewaxed naphthenic Coastal residual oil (long residuum).

Any of the above-described oils are suitable for use in the compositions of the present invention; however, the long residuum oil is most preferred. The range of values of viscosity index for oils of the Coastal grade variety is between about −20 and +80. Oils having viscosity indexes within this range, for example, between 60 and 80, are particularly useful in the compositions of the present invention. From between about 10 to 55 wt. percent, preferably 20 to 40 wt. percent, of the essentially asphalt-free plasticizer mineral oil is employed in the binder composition.

Ordinarily, the binder component used in the instant paving compositions contains a total of about 99% of the three described essential ingredients. However, the complete composition may contain up to about 5% by wt. of improving agents such as drying agents, anti-oxidants, etc.

The paving compositions of the instant invention have many varied uses but find particular utility as racetrack base components. In a typical layered track construction, from 2 to 12 inches of a base course is compacted upon a well-drained consolidated sub-base. The base course typically consists of about 40 wt. percent 1.25″ stone (trap rock), 40 wt. percent of ¾″ stone, 12.5 wt. percent ⅜″ stone, 5 wt. percent sand, and 2.5 wt. percent of 85/100 penetration grade asphalt. Onto the base course is then layered from 1 to 3 inches of a binder course consisting of about 45 wt. percent of ¾″ stone (trap rock), 33 wt. percent of ⅜″ stone, 18 wt. percent sand, and 4 wt percent of 85/100 penetration grade asphalt. On to the prepared substrata is then applied from 0.5 to 2.5 inches, preferably 1 to 2 inches of the paving composition of the present invention. The paving composition may typically consist of about 0.46 wt. percent cork (10–20 mesh), 0.24 wt. percent short fiber asbestos, 68.2 wt. percent coarse sand, 18.2 wt. percent fine sand, 3.9 wt. percent limestone filler, and 9 wt. percent binder composition. A 0.5 to 1.5-inch sand cushion is then placed on top of the prepared track.

This invention and its advantages will be better understood by reference to the following examples.

Example 1

A series of tests were conducted to demonstrate the superior recovery or resiliency properties of the paving compositions of the instant invention. The apparatus used in the test runs to determine the resiliency or recovery of particular test samples was a Goodyear-Healy Rebound Pendulum. In essence, the apparatus consists of a compound pendulum carrying a steel ball that is permitted to fall under gravity and strike a prepared specimen. Suitable features are provided in the instrument to measure the rebound of the specimen after contact with the impacting device. A detailed description of the test apparatus and the test method are covered in ASTM 1054–55.

In each of the tests, 2″ cylindrical specimens were prepared and utilized. Two of the compositions tested consisted of both wet and dry sandy loam a third composition type consisted of typical natural rubber (pure gum vulcanizate), and the remaining compositions consisted of binder-sand mixtures containing varying amounts of either cork, asbestos, or rubber. The loam samples were prepared by compacting native Long Island sandy loam which passed through a ¼″ sieve. The loam samples were oven cured at 200° F. for 12 hours. The wet loam compositions were prepared by wetting the oven cured samples. The binder used in all of the binder containing test compositions consisted of 60 wt. percent petroleum resin having a number average molecular weight between 1000 and 1500 formed by the aluminum chloride catalyzed polymerization of $C_5$ to $C_8$ olefins and diolefins contained in steam cracked naphtha; 10 wt. percent atactic polypropylene having a Kinsinger viscosity average molecular weight of 39,000 as determined in Decalin at 135° C.; and 30 wt. percent of a Coastal deasphalted undewaxed residuum mineral oil having an SSU viscosity at 210° F. of 222 and a flash point (Cleveland open cup) of 615° F.

The results of the test are set forth in Table I below. All test data were treated statistically reporting $n$ (the number of individual tests), $\overline{X}$ (the average test value), and S (the estimate of standard deviation for X).

TABLE I

| | Mix No. | | | | | |
|---|---|---|---|---|---|---|
| | 1 | 2 | 3 | 4 | 5 | 6 |
| | Composition [1] | | | | | |
| | A | B | C | D | E | F |
| Recovery, inches: | | | | | | |
| No. of tests [n] | 12 | 5 | 10 | 8 | 9 | 5 |
| Average value [$\overline{X}$] | 0.018 | 0.326 | 0.013 | 0.033 | 0.023 | 0.025 |
| Standard dev., [S] | 0.005 | 0.003 | 0.001 | 0.001 | 0.001 | 0.006 |

[1] A—Dry oven cured sandy loam. B—Typical natural rubber, pure gum vulcanizate. C—Binder, 10 wt. percent; powdered devulcanized, reclaimed rubber (Ramflex, U.S. Rubber Reclaiming Co.), 5 wt. percent; sand, 85 wt. percent. D—Binder, 17 wt. percent; cork (20–40 mesh), 4 wt percent; asbestos, 2 wt percent; sand, 77 wt. percent. E—Binder, 20 wt. percent; cork (20–40 mesh), 4 wt. percent; asbestos, 4 wt. percent; rubber, 5 wt. percent; sand, 67 wt. percent. F—Wetted oven cured sandy loam.

The above data illustrates that the paving compositions of the instant invention (composition D) has rebound or resiliency properties considerably superior to those exhibited by either the wet or dry loam compositions (compositions A and F) or binder type paving compositions that contain rubber (compositions C and E). The differences in recovery values between compositions D and E are particularly surprising in that composition E which contains 2% more asbestos than composition D and 5% rubber not contained in composition D exhibited recovery values significantly less than the recovery values demonstrated for the paving compositions of the present invention (composition D). Ordinarily, rubber containing compositions are more resilient than similar compositions which do not contain rubber. However, as shown in Table I the compositions of the present invention are superior in resiliency properties to similar compositions containing rubber.

Further advantages of this invention will be apparent to those skilled in the art. It is to be understood that this invention is not limited to the specific example set forth herein which has been offered merely as illustration and that modifications may be made without departing from the spirit and scope of the appended claims.

What is claimed is:

1. A paving composition consisting essentially of a mixture of 0.3 to 5.0 wt. percent cork, 0.2 to 5.0 wt. percent of asbestos, 77 to 96.5 wt. percent of mineral aggregate, and 3 to 13 wt. percent of a binder composition consisting essentially of 2 to 40 wt. percent of an amorphous polymer of propylene of from 0 to 20% crystallinity having a viscosity average molecular weight of at least about 10,000, 30 to 65 wt. percent of a petroleum resin, and 10 to 55 wt. percent of a plasticizer mineral oil.

2. The paving composition of claim 1 wherein said amorphous polymer of propylene of said binder composition is amorphous polypropylene of 0 to about 20 wt. percent crystallinity.

3. The composition of claim 2 wherein the binder component of said paving composition consists essentially of amorphous polypropylene of 0 to about 20 wt. percent crystallinity having a viscosity average molecular weight between about 10,000 to 200,000, a petroleum resin having a softening point measured by the Ball and Ring method of between about 125° to 250° F., and an average molecular weight of from 1000 to 1500, and a plasticizer mineral oil having a viscosity of at least 40 SSU at 210° F.

4. The paving composition of claim 3 wherein said thermoplastic binder composition contains between about 5 to 20 wt. percent amorphous polypropylene, between about 45 to 60 wt. percent of petroleum resin, and between about 20 to 40 wt. percent of said plasticizer mineral oil.

5. The composition of claim 3 consisting essentially of from 0.3 to 5.0 wt. percent cork, from 0.2 to 5.0 wt. percent asbestos, from 77 to 96.5 wt. percent mineral aggregate, and from 3 to 13 wt. percent binder composition.

6. The composition of claim 5 wherein said cork of said paving composition is finely divided cork passing through a #10 mesh sieve but retained on a #40 mesh sieve.

7. The composition of claim 6 wherein said binder composition consists essentially of between about 5 to 20 wt. percent of amorphous polypropylene of at least 85% atactic material having a viscosity average molecular weight between about 25,000 to 60,000, between about 45 to 60 wt. percent of petroleum resin of about 212° softening point and between about 20 to 40 wt. percent of a deasphalted undewaxed naphthenic Coastal residual oil as the plasticizer oil.

References Cited

UNITED STATES PATENTS

| | | |
|---|---|---|
| 3,070,568 | 12/1962 | Gessler et al. |
| 3,070,570 | 12/1962 | Gessler et al. |
| 3,093,601 | 6/1963 | Gessler et al. |
| 3,115,533 | 12/1963 | Wiseblood. |
| 3,297,625 | 1/1967 | Regenstein et al. |

WILLIAM H. SHORT, *Primary Examiner.*

E. NIELSEN, *Assistant Examiner.*

U.S. Cl. X.R.

260—17.5, 41